United States Patent [19]

Nogi

[11] Patent Number: 4,514,807
[45] Date of Patent: Apr. 30, 1985

[54] PARALLEL COMPUTER

[76] Inventor: Tatsuo Nogi, Mibugawadanchi 129,29-1 Mibugawacho, Chudoji, Shimogyo-ku, Kyoto, Japan

[21] Appl. No.: 579,545

[22] Filed: Feb. 13, 1984

Related U.S. Application Data

[63] Continuation of Ser. No. 263,603, May 14, 1981.

[30] Foreign Application Priority Data

May 21, 1980 [JP] Japan ................................. 55-68044

[51] Int. Cl.³ .......................... G06F 3/04; G06F 15/16
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,065,808 | 12/1977 | Schomberg et al. | 364/200 |
| 4,099,233 | 7/1978 | Barbagelata et al. | 364/200 |
| 4,412,286 | 10/1983 | O'Dowd et al. | 364/200 |
| 4,435,758 | 3/1984 | Lorie et al. | 364/200 |

OTHER PUBLICATIONS

"The Illiac IV Computer", pp. 746 to 757, Barnes et al., *IEEE Transaction on Computers*, Aug. 1968.
"Dap-A Distributed Array Processor", pp. 61 to 65, Reddaway, "First Annual Symposium of Computer Architecture," Dec. 1973.
"The Multiprocessor System SMS 201 Combining 128 Microprocessors to a Powerful Computer", pp. 222-230, Kober, Compcon 77 Fall Conference.

*Primary Examiner*—Eddie P. Chan
*Attorney, Agent, or Firm*—Morgan, Finnegan, Pine, Foley & Lee

[57] ABSTRACT

A parallel computer of a MIMD array type suitable for high speed computations in engineering and science, comprising a master unit, N submaster units and a two dimensional array of $N^2$ arithmetic units having own processors and private memories respectively, and further N common memories each of which is used for transferring some data between a submaster and a corresponding set of N arithmetic units, and finally a three dimensional array of buffer memories with a capacity being composed of N grand boards each (alternatively the k-th grand board) of which has $N^2$ memory units and is provided for transferring some data between every pair of an arithmetic unit being on a (the k-th) row of the arithmetic unit array and another unit being on the corresponding (the k-th) column.

2 Claims, 8 Drawing Figures

Fig.5 ial differential equations numerically. Among them, ILLIAC-IV is a representative one. It is literally a multi-processor system of a two
PARALLEL COMPUTER This is a continuation of application Ser. No. 263,603 filed May 14, 1981.

BACKGROUND OF THE INVENTION

This invention relates to a parallel computer, and more particularly, to a MIMD arrayed computer suitable for high speed computing in engineering and science. The computer employs a multi-processor system with a certain number of buffer memories provided for transferring data among slave processing units.

Up to the present time, several kinds of multi-processor systems of array types have been developed especially for solving partial differential equations numerically. Among them, ILLIAC-IV is a representative one. It is literally a multi-processor system of a two dimensional array type, with a network of data buses for providing a path only between every pair of adjacent processors. Hence it has an essential defect that it is troublesome and takes a long time to transfer data between any two separated processors.

Another multi-processor system with a cross-bar switch permitting a direct transfer of data between any two processors does not suffer a loss of throughput in a data transfer. However, as it usually needs a vast sum of hardware, it has been avoided for usage.

The most important problem is how to exchange data among processors when it is intended to design a parallel computer. In Japanese Patent Application No. 92,927 of 1979 of the same applicant as this application, a parallel computer with a two dimensional array of buffer memories is disclosed, which makes it possible to exchange data between any two processors, but does not have large volume of hardware so much. Nevertheless, it is again a difficult problem to increase the number of processors in the same configuration.

SUMMARY OF THE INVENTION

Accordingly, it is an object of the present invention to provide a new parallel computer intended to hold an advantage over the previous one, and yet not to increase the hardware so much. On the new machine, a direct exchange of data is not allowed for every pair of processors, but an indirect exchange is always possible if another processor is used as a mediator. Also, it is noticed that, if the number of slave processors is $N^2$, the number of buffer memory units in the new machine is $N^3$ while that in the previous machine is $N^4$.

In brief, the parallel computer of this invention is a hierarchy composed of a master processor, N submaster processors and $N^2$ slave processors. The master processor makes a synchronization of the whole sysstem and plays the role of an INPUT/OUTPUT processor. The submasters are connected to it directly through channels. To every submaster, corresponding N slaves are connected by each common memory which are read from both sides of the submaster and the slaves. Every submaster makes a synchronization among its slaves and plays the role of a distributor of programs and a mediator of data between the master and its slaves.

This computer is provided with a fairly vast buffer memory. A capacity of memory is taken as a unit which is called a memory unit. Another unit is a buffer memory board which is composed of $N^2$ memory units. The whole buffer memory consists of N boards with the number $k = 1, 2, \ldots, N$. The k-th board is for bufferring when transferring data bi-directionally (alternatively in a direction) between one slave on the k-th row and one on the k-th column in the two dimensional array of slaves. As a component of the buffer memory, either a RAM (Random Access Memory) or a FIFO (First-In-First-Out memory) may be used. In either case, a hardware structure may be suited for either bi-directional or uni-directional read/write ability. In view of efficiency, the RAM is superior to the FIFO and the bi-directional structure is superior to the uni-directional one. On the other hand, in view of hardware, it is less for the FIFO than for the RAM, and it is less for the uni-directional structure than for the bi-directional one. In the case of using the FIFO, a transfer speed is, however, not so slow in comparison with the case of the RAM, if a DMA channel is set between every slave and every FIFO.

The only case mentioned in the following is that the RAM is used for the buffer memory, and it is accessed from both sides of the row and column positions of slaves. Then, it is used not only as the buffer memory but also as a memory for working.

Besides, all processors are provided with private memories.

BRIEF DESCRIPTION OF THE DRAWINGS

The present invention is described with reference to the following drawings which forms a part of the specification and wherein:

FIG. 5 is a diagram of the arrangement of slave units in two ways to the j- and i- directions involving the manner of communication between any two units therein;

DETAILED DESCRIPTION OF THE PREFERRED EMBODIMENT

Figure 1:
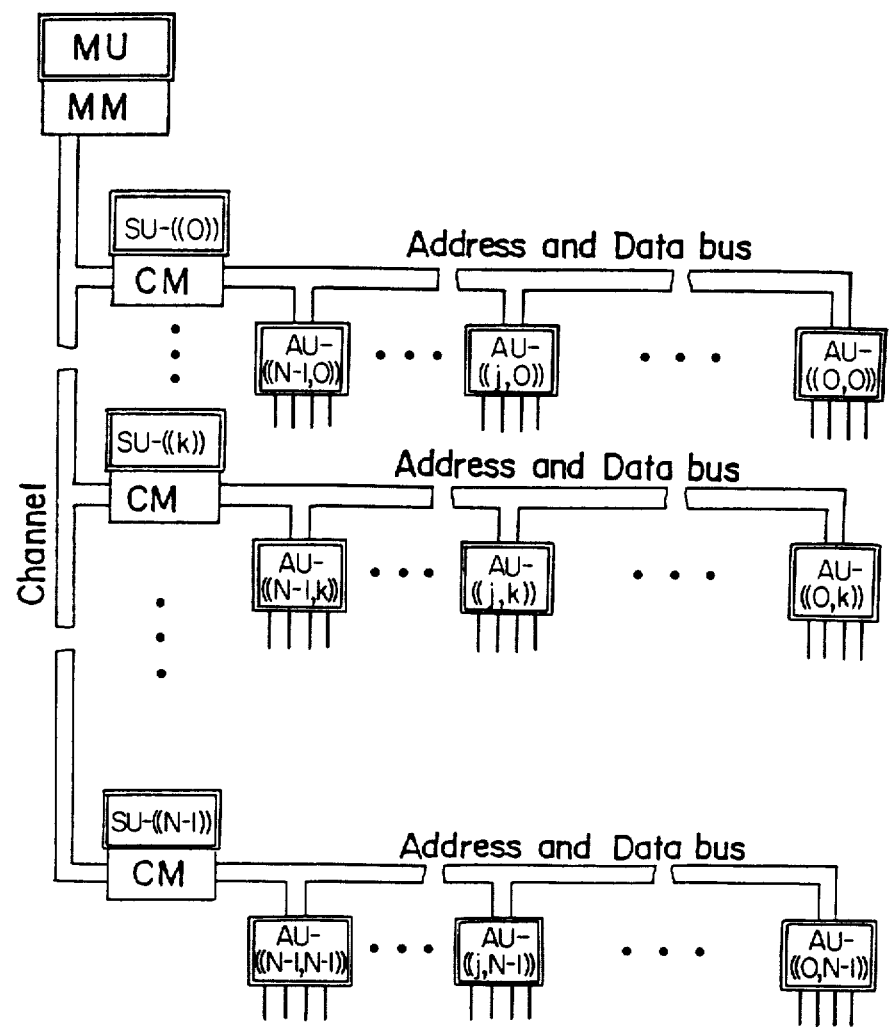
FIG. 1 is a functional block diagram of a preferred embodiment of the parallel computer employing a multi-processor system in accordance with the invention and showing an outline of the bus connection between the levels of hierarchy composed of a master unit, submaster units and slave or arithmetic units.

A method of bus connection embodied in the parallel computer of this invention will now be cleared by referring to the drawings wherein MU denotes the master processor, SU-((k)) (or simply ((k)); k=0,1, ..., N−1) denotes the k-th submaster processor and AU-((j,k)) (or simply ((j,k)); j,k=0,1, ..., N−1) denotes the slave processor on the cross point of the jth row and the kth column in the two dimensional array. Further, (i,j)$_k$ (i,j,k=0,1, ..., N−1) denotes the (i,j)-th memory unit on the k-th memory unit.

FIG. 1 shows an outline of the bus connection between MU and every SU, and between every SU and the corresponding AU's. Here MM is the main memory of MU, and CM is a common memory accessible from both sides of a SU and the corresponding AU's. An access by an AU is allowed under control of its master SU. Two other buses from every AU, seen in FIG. 1, go to two corresponding memory units respectively. The details are seen in FIG. 2.

Figure 2:
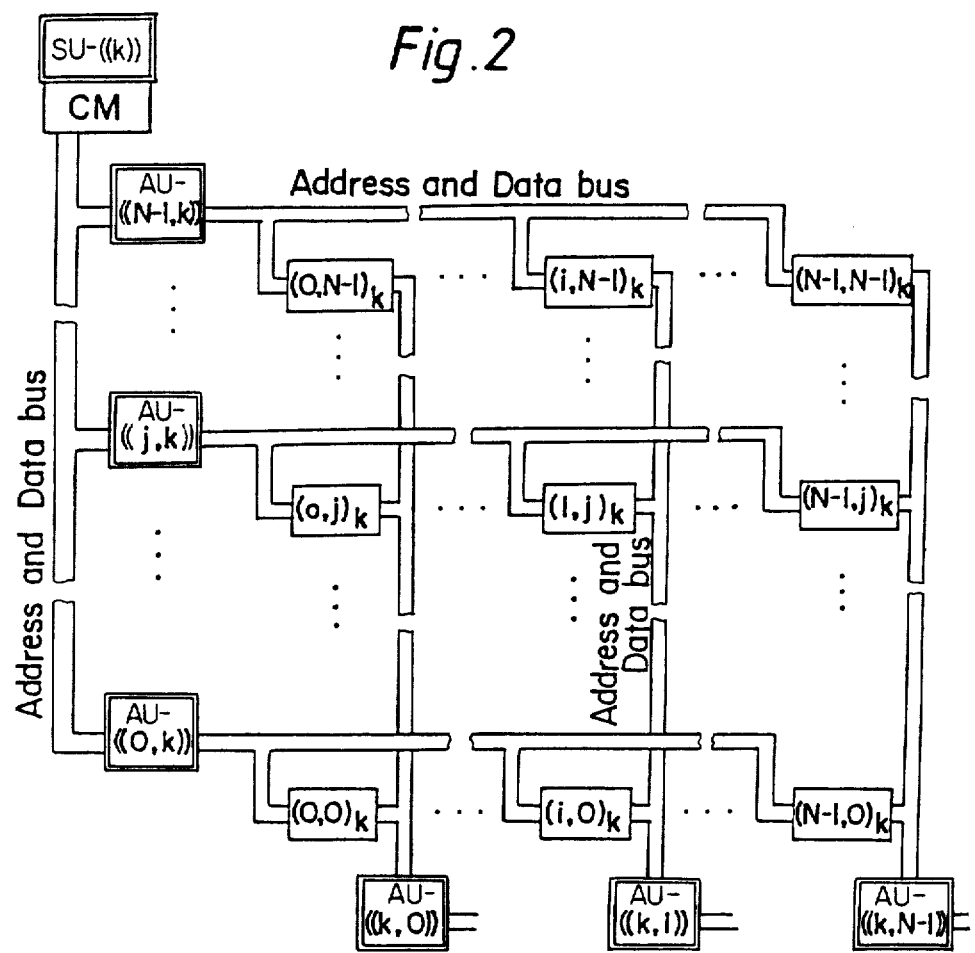
FIG. 2 is a functional block diagram of a subsystem composed of a submaster unit, its slave units and the associated buffer memories in the form of a memory board which are connected to the respective one slave units of the other subsystems, the address and data bus interconnecting the submaster unit and its slave units being shown as rotated counter-clockwise with respect to the orientation of same being shown in FIG. 1.

FIG. 2 shows a subsystem composed of SU-((k)), AU-((j,k))(j=0,1, ..., N−1), AU-((k,i))(i=0,1, ..., N−1) and the k-th memory board. Each memory unit (i,j)$_k$ is accessed only by two processors ((j,k)) and ((k,i)). Their competition of access is helped by the control of ((k)).

Usually, the control is taken in the following way: at a time, every processor ((j,k))(j=0,1, ..., N−1) accesses corresponding buffer memory units (i,j)$_k$(i=0,1, ..., N−1) together, and at another time every processor ((k,i))(i=0,1, ..., N−1) accesses corresponding units (i,j)$_k$(j=0,1, ..., N−1) together. Besides, it is also possible for a AU to write data in a whole memory row or column in a broadcasting manner.

Another bus from every AU, seen in FIG. 2, goes to another corresponding buffer memory board.

By such a manner of bus connection, a direct transfer of data through the k-th memory board is permissible only between one of ((j,k))(j=0,1, ..., N−1) and one of ((k,i))(i=0, 1, ..., N−1). Such a manner of connection is described by the scheme $$((j,k)) \rightarrow (i,j)_k \rightarrow ((k,i)).$$

As a rule, it is expressed as follows:

(i) A direct transfer of data through the k-th buffer memory board is possible between two processors with the number k in the brackets ((,)) before and after their commas respectively;

(ii) It is, then, the buffer memory (i,j)$_k$ that stands, for example, between two processors ((j,k)) and ((k,i)). The name is indicated in the following manner: to shift the pair of numbers in a processor's name in such a way so as to put out the number k common to those processors from each double bracket at once, to make the removed number k a suffix of a single bracket with the number left like that (,j)$_k$ or (i,)$_k$ and put the number i or j, being a counterpart to the common number k in the double bracket of the partner processor, into the blank of the single bracket.

It is, however, impossible to transfer data directly even between any two processors on the same row or column, for example, between ((j,k)) and ((j-1,k)).

Nevertheless, an indirect transfer is always allowed between any two AU's, only if another AU is used as a mediator. In fact, a transfer from ((j,k)) to ((l,m)) is done in the following way: ((j,k)) writes the data in the buffer memory unit (l,j)$_k$, then ((k,l)) reads them and writes again in (m,k)$_l$, and finally ((l,m)) reads them. The procedure is described in such a scheme as $$((j,k)) \rightarrow (l,j)_k \rightarrow ((k,l)) \rightarrow (m,k)_l \rightarrow ((l,m)).$$

Therefore it is found that such an indirect transfer needs only one more READ and WRITE operation in comparison with a direct transfer. Moreover, it is done uniformly for every pair of processors, and it takes a time not depending on their distance (or exactly the distance of their numbers).

For a later purpose to estimate the efficiency of the bus connection mentioned above, it is necessary to give methods of alloting the AU's and buffer memory units in applications for solving partial differential equations in a 3 or 2 dimensional space.

Figure 3:
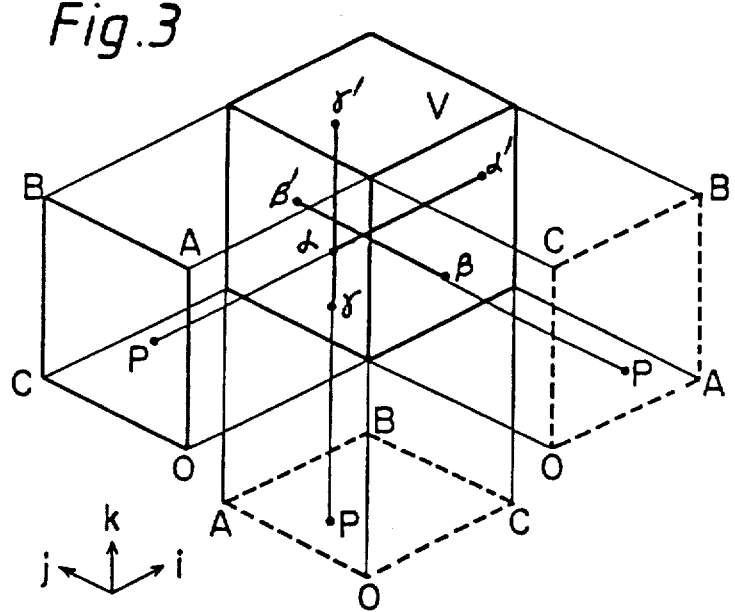
FIG. 3 is a principle diagram of a cube in a triple number space (i, j, k) corresponding to a discrete coordinate (Xi, Yj, Zk) in a three dimentional space (X, Y, Z) wherein a processor is represented by "p" points.

In FIG. 3, V means a cube in a triple number space (i,j,k), corresponding to a discrete coordinate $(x_i, y_j, z_k)$ in a 3 dimensional space (x,y,z). When it is projected to the square OABC being perpendicular to the i-direction, an array of the number points (j,k) is produced on the square as a projection of all the lattice points in V. Then, every AU-((j,k)) is first made to correspond to each point (j,k) on the square. Such a processor is represented by P in FIG. 3. Processor P is first expected to play the role of computation on every lattice point which has been projected to the point P. Such lattice points are represented by a line $\alpha\alpha'$ in FIG. 3.

Further, the square OABC of the AU's is assumed to stand at two more positions where the projections of V to the j- and k-directions are produced respectively, as shown by the squares with broken sides in FIG. 3. Every AU is also assumed to take the role of computation on the two lines $\beta\beta'$ and $\gamma\gamma'$ of the lattice points. Thus, all the lattice points of V are covered threefold by AU's.

Such a configuration is very favorable especially for the ADI method to solve partial differential equations. It reduces a fundamental cycle of solution to three fractional steps, in each of which a revised difference equation being implicit only in a direction is solved respectively. In order to solve the equation on the concerning fractional step, some results of former fractional steps are usually necessary. Therefore, those results must be transferred from processor to processor.

Figure 4:
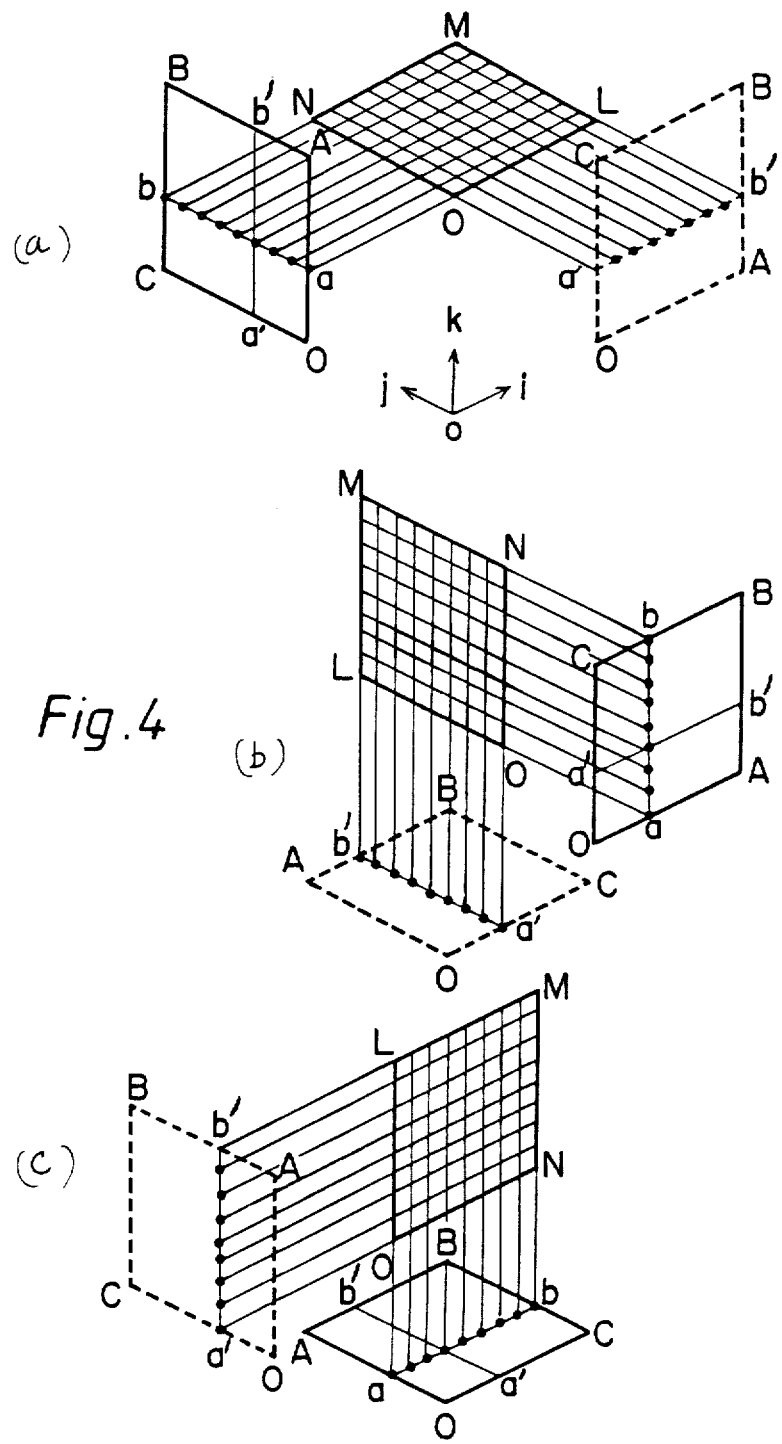
FIGS. 4a, 4b and 4c are principle diagrams of the buffer memory board in the first, second and third positions, respectively, and showing how to correspond the buffer memory to lattice points to be computed in the cube as shown in FIG. 3.

An aim of setting the special buffer memory is just for such transfers. FIG. 4a,b,c show how to correspond the buffer memory to the lattice points in V, and how to connect the buses from the AU's to the buffer memory. The square OABC has the same meaning as in FIG. 3. In FIG. 4a, the square OLMN is a buffer memory board. Let it be the k-th board from the bottom. Then, as mentioned above, every row of buffer memory units, (i,j)$_k$(i=0, 1, ..., N−1), is connected to a corresponding processor ((j,k)) on the row ab of the square OABC. Also, every column of buffer memory units (i,j)$_k$(j=0,1, ..., N−1) on the same board is connected to a corresponding processor ((k,i)) on the column a'b'. Let every memory unit allot to each node of a net produced by the lines drawn from all the processors on ab and a'b' to the i-direction and the j-direction, respectively.

Then, the number of processors being related to each buffer memory unit is only two. If RAM is used for the buffer memory, two concerning processors are allowed to access a corresponding unit directly. On the other hand, if FIFO is used, two DMA channels from two concerning processors are connected to a corresponding unit.

As a whole, N buffer memory boards are set up for $k=0,1,\ldots,N-1$.

As regards the application of the ADI method, after every processor writes some results computed on a corresponding row of lattice points into a corresponding row of buffer memory units. It reads other results in the form of a data column from a corresponding column of buffer memory units at the position indicated by the square with broken side lines in FIG. 4a. Then it goes to the next step to solve difference equations being implicit with respect to the j-direction.

FIG. 4b shows the second position of a buffer memory board and the array of processors in the fixed space. Let the board be the k-th one from the left and correspond to the k-th vertical plane of lattice points in V. FIG. 4b shows also that, once rows of data in the j-direction are written in corresponding rows of buffer memory units, the data can be read from columns of buffer memory units in the form of data columns in the k-direction.

FIG. 4c shows the third position of the k-th buffer memory board and the array of processors. Again, it shows that, once rows of data in the k-direction are written in respective rows of buffer memory units, the data can be read from columns of buffer memory units in the form of data columns in the i-direction.

It must be noted that, though FIG. 4a,b,c show different cases of position, the relative relations among the AU's and the buffer memory boards are the same for all cases. Therefore, only one complex of a two dimensional array of AU's and a set of buffer memory boards are sufficient, and they are used in three ways.

By such a consideration, it follows that this computer may reduce the computation time of the ADI method by $1/N^2$ times exactly.

This computer is, of course, not restricted only to the application of the ADI method. Later examples of computation will show that it is also efficient for other methods of solution.

Moreover, it is desirable to have an ability to treat difference equations on a two or one dimensional lattice and to get universality. For this purpose, it is preferable that this computer be regarded as another complex of a one dimensional array of processors and a two dimensional array of buffer memory units just like the previous "Parallel Computer" 92927 in 1979. However, since this new computer has not so many buffer memory units as to allow a direct transfer of data between any two processors, some proper ideas must be brought in use.

Figure 5:
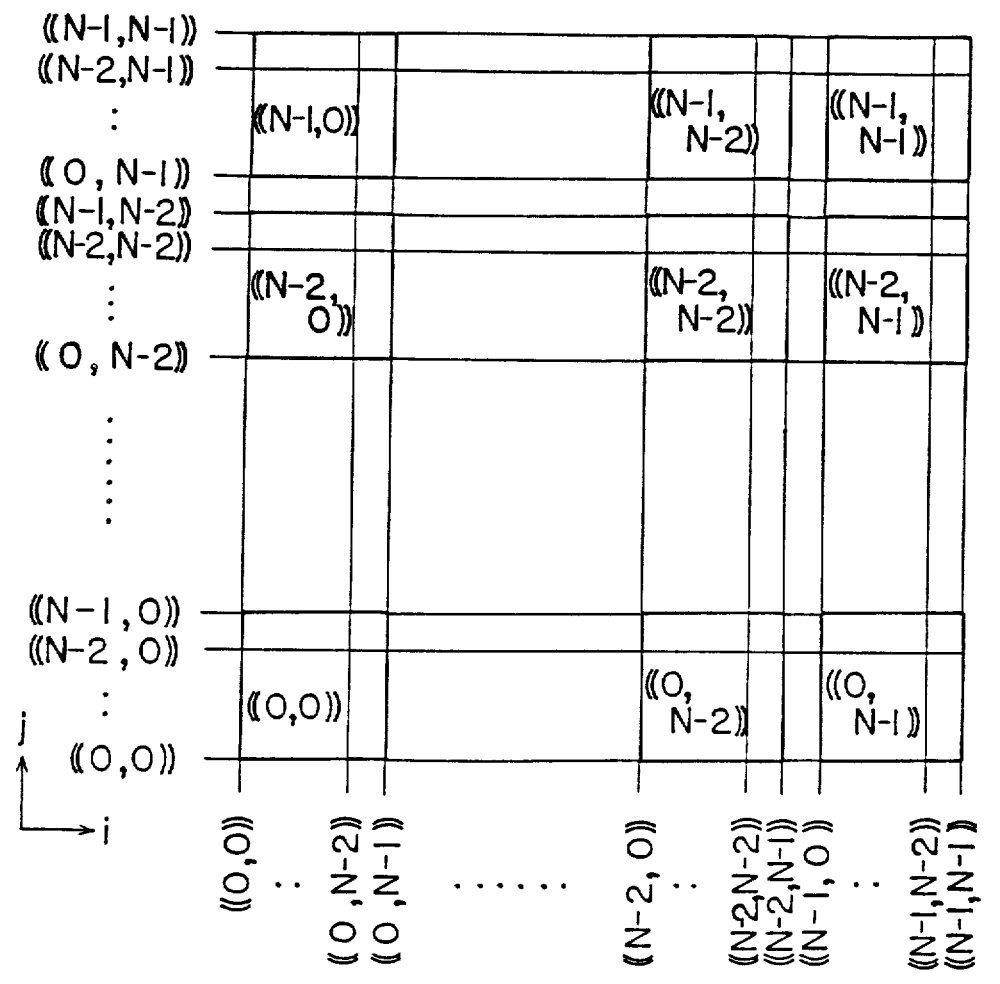

An effective way is brought from the consideration mentioned already, that an indirect transfer is always possible by the help of another processor. In fact, the AU's are all arranged in two ways to the j- and i-direction respectively, with different orderings as seen in the left and bottom sides of FIG. 5. Then, the given buffer memory units are, of course, not sufficient to be alloted to all nodes of a net produced by direct lines drawn from all the AU's in both directions. The nodes to which memory units are really allotted are only what, in FIG. 5, are found in the squares with thick side lines lying the diagonal from the right-top to the left-bottom of the figure. Among those processors being connected to diagonal squares, a direct transfer is always permissible, but it is impossible in general. It is, however, allowed to transfer data indirectly between ay two processors through another mediating processor indicated in a corresponding square on the off-diagonal. Yet, processors are indicated in the diagonal squares and they also are, if necessary, used so that all transfers among the AU's may be done in a uniform way.

Figure 6:
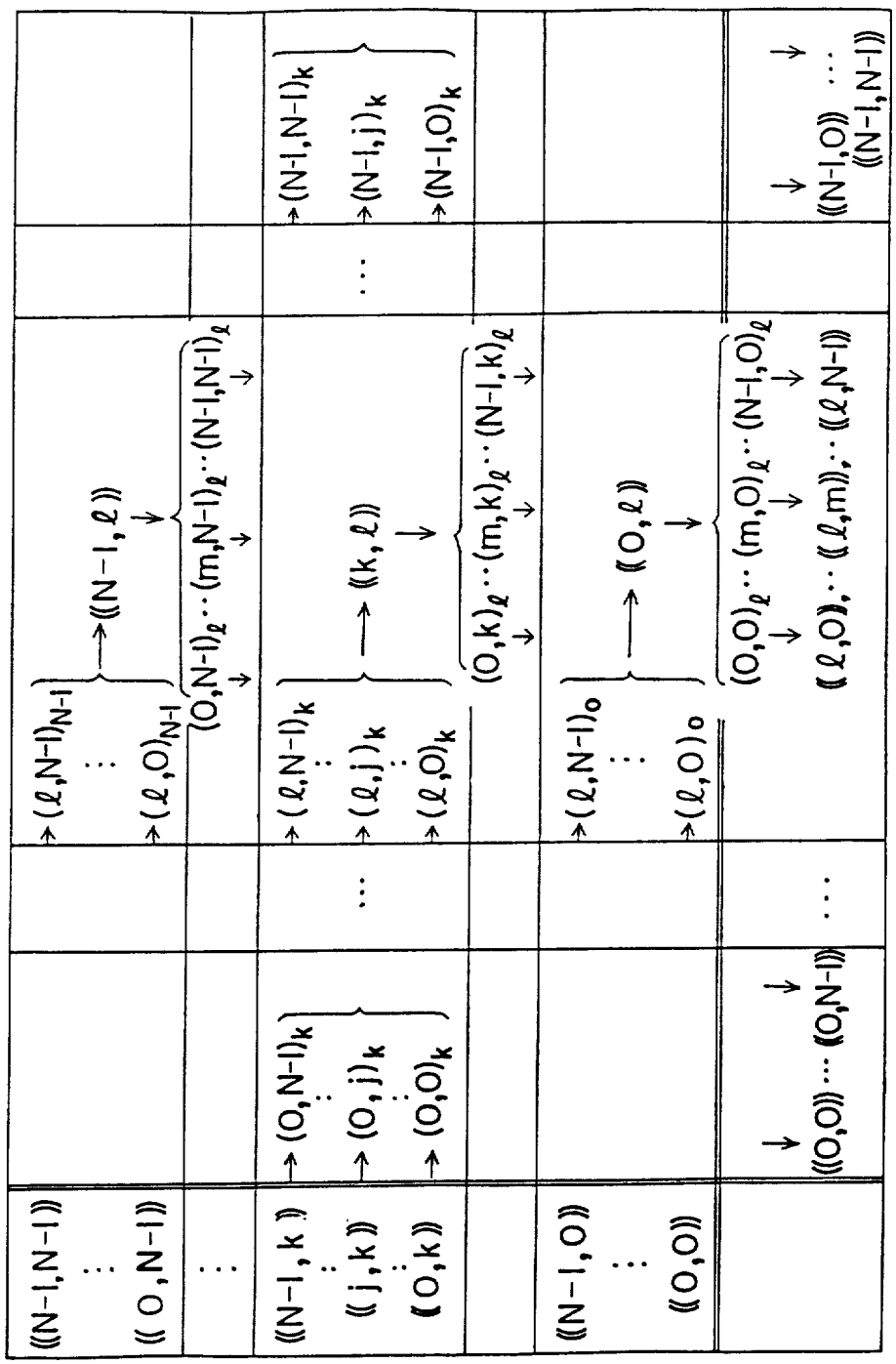
FIG. 6 is a diagram of data flow in one directional series of slave units.

FIG. 6 shows a case of data flow where, it is assumed, every processor has data on each one dimensional lattice in the i-direction and then receives data on each one dimensional lattice in the j-direction in a fully parallel way. The details are as follows:

(i) Every processor ((j,k)) decomposes $N^2$ data on each row of lattice points into N sets of n-tuple data, and writes them in N buffer memory units $(0,j)_k$, $(1,j)_k$, $\ldots$, $(N-1,j)_k$ respectively;

(ii) The following procedure is repeated for $m=0,1,\ldots,N-1$ successively; every processor ((k,l)) reads the m-th data from all N buffer memory units $(l,0)_k$, $\ldots$, $(l,j)_k$, $\ldots$, $(l,N-1)_k$ respectively, considers them as a N-tuple data and writes in the buffer memory unit $(m,k)_l$;

(iii) Every processor ((l,m)) reads N sets of N-tuple data from the buffer memory units $(m,0)_l$, $\ldots$, $(m,k)_l$, $\ldots$, $(m,N-1)_l$ respectively.

It is seen above that, in comparison with a machine having so many buffer memory units as to be allotted to all nodes of $N^2 \times N^2$, the second step (ii) to mediate data is excessive. However, it does not take so much time. It is hence found that this new computer also solves on a two or one dimensional lattice with a high efficiency, and has an ability for a wide range of applications.

Now, a design of embodying this invention is exposed in order to give theoretical estimates of efficiency concretely. Though the aim of developing this computer is clearly an achievement of ultimate high speed by the parallel architecture in addition to the use of ultimate high speed elements, only a trial composed of inexpensive micro-processors on the market is considered, and its efficiency is estimated.

Every processor adopted is a super minicomputer or a LSI minicomputer of TOSBAC series 7, with an ability of 16 bit parallel operations and some macro commands of floating-point number operations.

Provided processors are a MU, 16 SU's and 256 AU's. As the MU, TOSBAC 7/40 is used and, as the SU or AU, TOSBAC 7/10 (micro 7) is used. Some data of those minicomputers are given as follows:

MU has a main memory of NMOS, and its cycle time is 0.36 μs per a half word (two bytes), and its maximum capacity is 512K bytes. Between MU and every SU, a DMA bus is provided, and its transfer speed is 1M bytes/sec. Every SU also has a main memory of 48K bytes (CMOS) and 16K bytes (EPROM) with cycle time 1.4 μs and 1.1 μs per a half word respectively. A portion of the CMOS memory (16K bytes) is used as a common memory accessed from both sides of a SU and its slave AU's. Also, every AU has a main memory of 16K bytes (CMOS) and 16K bytes (EPROM). The remainder of the AU's address space is still 32K bytes, a half of which is used for accessing a common memory, and the other half is used for accessing the buffer memory.

AU's machine times in floating-point operations are as follows:

| LE: | Register | (Memory) | 15 ~ 38.3 μs |
|---|---|---|---|
| STE: | Memory | (Register) | 11.25 μs |
| AE: | Register | (Register) + (Memory) | 38.3 ~ 58.1 μs |
| SE: | Register | (Register) − (Memory) | 40.13 ~ 60 μs |
| ME: | Register | (Register) * (Memory) | 13.1 ~ 85.9 μs |

-continued

| DE: | Register | (Register) / (Memory) | 15.4 ~ 80.6 μs |
|---|---|---|---|

As the buffer memory, 4096 units are prepared, and every unit is composed of two chips of MOS STATIC RAM F3539. Its access time is 650 ns and its capacity is 256×8 bits. Hence, the unit has a capacity of 256 half words.

On embodying the buffer memory, 16 memory units are set up on a real board in a matrix form of 4×4. Moreover, 16 boards are put together in a 'grand board' which we call a buffer memory board. 16 grand boards complete the buffer memory.

Figure 7:
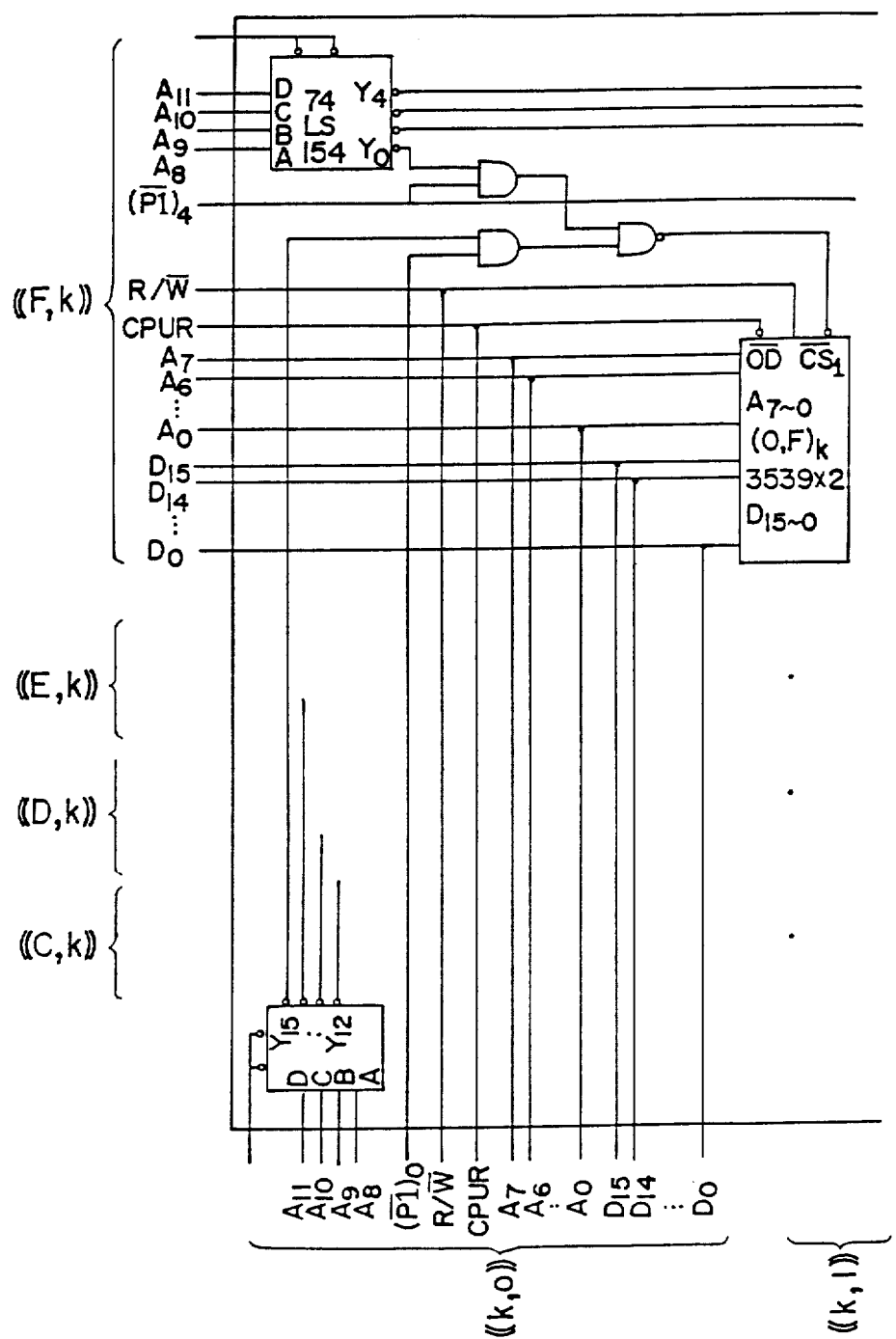
FIG. 7 is a wiring diagram of buses connected to the buffer memory board in which control signals arrive.

It is seen in FIG. 7 which signals and buses are connected to a real board. In fact, it shows such control signal lines and such address and data buses that come in the buffer memory unit $(0,F)_k$, which is located at the extreme left and upper board of the k-th grand board.

It is assumed that at any time, either set of lines from the left or that from the bottom of FIG. 7 is selected. The control signals coming to every memory unit are $\overline{CS}$ (Chip Select), $\overline{OD}$ (Output Disable) and R/$\overline{W}$ (Read/Write selection). $(\overline{P1})_4$ means the fourth bit of the port P1 of AU, and it is an output for selecting all the buffer memory units forming a full row on a buffer memory board. $(\overline{P1})_0$ also means the 0-th bit of P1 and is an output for selecting all the units forming a full column on another buffer memory board.

Figure 8:
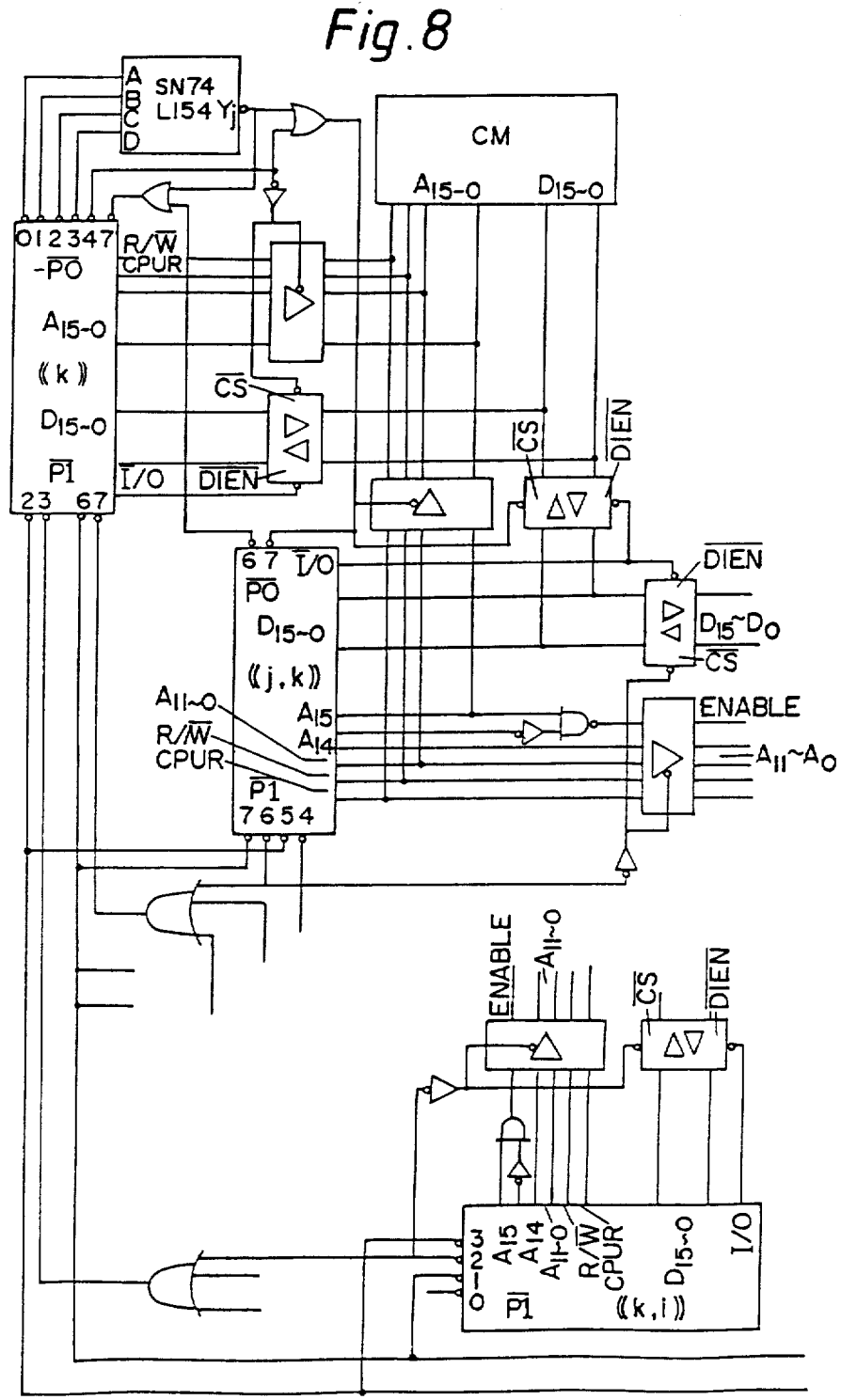
FIG. 8 is a circuit diagram of logic for avoiding a competition between signals and buses, and accessing the common memory in a subsystem.

FIG. 8 shows the logic for cutting a competition of signals and buses, and also gives a method to access the common memory in a SU. Especially, it gives the logic and the connection among SU-((k)), AU-((j,k)) (j=0,1, ..., F) and AU-((k,i)) (i=0,1, ..., F).

As an illustration of the control, a typical example of application is given as follows:

(i) Every ((j,k)) (j=0,1, ..., F) writes some data in all the buffer memory unit $(i,j)_k$ (i=0,1, ..., F), then issues an end signal through $(\overline{P1})_6$, and closes the horizontal lines of FIG. 7. When they all complete writing, ((k)) receives a total end signal through $(\overline{P1})_7$.

(ii) ((k)) clears its $(P1)_6$ and issues a signal of having received it through $(\overline{P1})_7$. The signal comes to every $(\overline{P1})_7$ of ((j,k)) (j=0,1, ..., F). After receiving it, ((j,k)) clears its own $(\overline{P1})_7$. The same signal also comes to every $(\overline{P1})_1$ of ((k,i)) (i=0,1, ..., F). After receiving it, ((k,i)) opens vertical lines by making $(\overline{P1})_2$ low.

(iii) Every ((k,i)) (i=0,1, ..., F) writes some results in all the buffer memory units $(i,j)_k$ (j=0,1, ..., F), then issues another end signal through $(\overline{P1})_2$, and closes the vertical lines. When they all complete writing, ((k)) receives another total end signal through $(\overline{P1})_3$.

(iv) ((k)) clears $(\overline{P1})_3$ and issues a signal of having received it through $(\overline{P1})_3$. The signal comes to every $(\overline{P1})_3$ of ((k,i)) (i=0,1, ..., F). After receiving it, ((j,k)) opens horizontal lines by making $(\overline{P1})_6$ low, and returns to (i).

When some results have to be transferred to ((k)), (v) ((k)) puts a number '1j' on $(P0)_{4\sim0}$. Then, the lines from ((j,k)) are opened also to the common memory of ((k)). After receiving a signal of their having been opened through $(\overline{P0})_7$, ((j,k)) starts to transfer data. When it is completed, ((j,k)) issues an end signal through $(\overline{P0})_2$, and ((k)) receives it through $(\overline{P0})_7$.

In the followings, it is shown by estimating computation times for some typical examples that the machine of this invention has a very high efficiency. For this purpose, two kinds of computation time are compared: a time lost by a parallel processing of the AU's, and that by a uni-processing of a single AU for a computation problem. The former is called the parallel processing time $P_t$, and the latter is called the uni-processing time $S_t$. A computation time means here a theoretical value evaluated by following a program written in a machine language. In such an evaluation, the times of the floating-point operations are represented by their middle values, since they are not estimated exactly for all cases beforehand. On uni-processing by an AU, it is assumed for a fair comparison that its main memory is enough to keep all the data.

As an index of comparison, an efficiency R defined by $$R = r/N^2$$

is used when a parallel computation is done by $N^2$ AU's, where $$r = S_t/P_t$$

is another index meaning that the parallel processing gets a speed-up by r times in comparison with the uni-processing. The most ideal case is when $r = N^2$, but an ordinary case is when $r < N^2$.

For the convenience of illustrating some methods of application, it is necessary to introduce some symbols and words beforehand.

First, (m=·) indicates a location in a buffer memory unit occupied by a concerning data word. It was already mentioned that there are three ways to correspond the buffer memory to a cube in a lattice space as seen in FIG. 4a,b,c. Those positions of the processors and the buffer memory are called a-position, b-position and c-position repectively. In any position, a one dimensional array of N buffer memory units projected to a point on the plane of processors in the direction parallel to the side OL, oralternatively to the side ON, is called a memory row or a memory column.

EXAMPLE 1

(ADI method for a three dimensional heat conduction)

A difference method is considered here. It is applied for solving the problem of finding a function $u = u(x,y,z,t)$ satisfying the equations $$\frac{\partial u}{\partial t} = \Delta u \left( \Delta = \frac{\partial^2}{\partial x^2} + \frac{\partial^2}{\partial y^2} + \frac{\partial^2}{\partial z^2} \right), t > 0, (x,y,z) \in G,$$

$$u(x,y,z,t) = g(x,y,z,t), t > 0, (x,y,z) \in \Gamma,$$

$$u(x,y,z,0) = f(x,y,z), (x,y,z) \in G,$$

in the domain $G = \{0 < x,y,z < 1\}$. Here, $\Gamma$ is the boundary of G, and g and f are given functions.

G is covered by a net of lattice points produced as cross points of the planes with a parameter h (mesh width)

$$x = x_i = ih, y = y_j = jh, z = z_k = kh, i,j,k = 0,1, \ldots, N+1,$$
$$(N+1)h = 1.$$

$U = U_{i,j,k} = U(x_i, y_j, z_k)$ denotes an approximate function for u defined on the lattice. Also, $U^n$ denotes a value of the function U at a time $t = n\tau$ (n=0,1,2, ... ), $\tau$ being a time step.

The heat equation is replaced by the well-known Douglas-Rachford implicit scheme:

$$(1-\lambda\Delta_1)U^{n+1*}=[1+\lambda(\Delta_2+\Delta_3)]U^n, \quad (1)$$

$$(1-\lambda\Delta_2)U^{n+1**}=U^{n+1*}-\lambda\Delta_2 U^n, \quad (2)$$

$$(1-\lambda\Delta_3)U^{n+1}=U^{n+1**}-\lambda\Delta_3 U^n, \quad (3)$$

where $\lambda=\tau/h^2$ and $\Delta_i$ (i=1,2,3) is the difference operator defined as $$\Delta_1 U_{i,j,k}=U_{i+1,j,k}-2U_{i,j,k}+U_{i-1,j,k},$$

$$\Delta_2 U_{i,j,k}=U_{i,j+1,k}-2U_{i,j,k}+U_{i,j-1,k}$$

and $$\Delta_3 U_{i,j,k}=U_{i,j,k+1}-2U_{i,j,k}+U_{i,j,k-1}$$

respectively. The above scheme determines $U^{n+1}$ from $U^n$, and it is used repeatedly for n=0,1,2, . . . . It is seen in the scheme that two functions, $U^{n+1*}$ and $U^{n+1**}$, stand as auxiliary functions. Therefore, three fractional steps of finding $U^{n+1*}$, $U^{n+1**}$ and $U^{n+1}$ complete one step from n to n+1. An important characteristic of the scheme is that every equation of (1), (2) and (3) has a fully blocked coefficient matrix. In fact, (1) may be decomposed in $N^2$ subsets corresponding to all (j,k)'s respectively, each of which has only N unknowns $U_{i,j,k}^{n+1*}$ (i=1,2, . . . , N). Therefore, they are solved independently of one another. (2) and (3) may also be decomposed in a similar way. Also, every coefficient sub-matrix is tri-diagonal. Hence, every equation is easily solved by the so-called double sweep method, in which the number of arithmetic operations amounts to O(N) in general.

The computer of this invention is very suitable for such a problem. In fact, if the number N of lattice points standing on a line parallel to each coordinate axis is assumed to be equal to the number of processors on each row or column of the AU's plane for simplicity, every subsystem of (1) is solved by a corresponding processor respectively. The (j,k)-th equation is solved by ((j−1,k−1)). Then, the $N^2$ subsystems are all solved in a fully parallel way. The equation (2) and (3) are also solved in a similar manner. Details of the procedure are as follows:

(i) First, it is assumed that the buffer memory in the c-position has $U^n$(m=0), $\lambda\Delta_2 U^n$(m=1) and $\lambda\Delta_3 U^n$(m=2), and that in the b-position it also has $\lambda\Delta_3 U^n$(m=3).

(ii) Every processor gets $U^n$, $\lambda\Delta_2 U^n$ and $\lambda\Delta_3 U^n$ from each of the memory rows (m=0,1,2), and then gets each component of the right hand vector of (1). Every processor solves each equation, and $U^{n+1*}$ is then found. Further, $U^{n+1*}$ and $\lambda\Delta_2 U^n$ are stored in the memory rows (m=4,5) of the a-position.

(iii) Every processor gets $U^{n+1*}$ and $\lambda\Delta_2 U^n$ from the memory columns of the a-position, solves each equation of (2), and writes its solution $U^{n+1**}$ in the memory row (m=6) of the b-position.

(iv) Every processor gets $U^{n+1**}$ and $\lambda\Delta_3 U^n$ from the memory columns (m=6,3) of the b-position, solves each equation of (3). It then stores its solution $U^{n+1}$ in the memory column (m=6) of the b-position, and also in the memory row (m=0) of the c-position.

(v) Every processor gets $U^{n+1}$ from the memory column (m=6) of the b-position, finds $\lambda\Delta_2 U^{n+1}$, and stores it in the memory row (m=3) of the b-position. Moreover, every processor gets $U^{n+1}$ and $\lambda\Delta_2 U^{n+1}$ from the memory columns (m=6,3) of the b-position, and stores them in the memory rows (m=0,1) of the c-position, computes $\lambda\Delta_3 U^{n+1}$, and stores it in the memory row (m=2). Then, the procedure returns to (i) of the next time step.

In this case, it is found, without summing up the computation times, that the parallel processing time $P_t$ is almost $1/N^2$ times of the uni-processing time $S_t$, that is, the efficiency is almost 100%. It is because all the work of the AU's is done in a fully parallel way, and without any special additional transferring.

EXAMPLE 2

(A simple difference scheme for the problem of Example 1)

A simple explicit scheme $$U^{n+1}=U^n+\lambda(\Delta_1 U^n+\Delta_2 U^n+\Delta_3 U^n)$$

is considered. A realization of this scheme on the computer of this invention is as follows:

(i) First, it is assumed that $U^n$ is stored in the buffer memory (m=0) of the a-position.

(ii) Every processor gets $U^n$ from the memory row (m=0) of the a-position, computes $\Delta_1 U^n$, and writes it in the memory row (m=1) of the same position.

(iii) Every processor gets $U^n$ from the memory column (m=0) of the a-position, computes $\Delta_2 U^n$, and writes it in the memory column (m=2).

(iv) Every processor gets $U^n$ from the memory row (m=0) of the a-position, and writes it in the memory column (m=3) of the c-position.

(v) Every processor gets $U^n$ from the memory row of the c-position, computes $\Delta_3 U^n$, and writes it in the memory row (m=4) of the c-position.

(vi) Every processor gets $\Delta_3 U^n$ from the memory column (m=4) of the c-position, and gets $U^n$, $\Delta_1 U^n$ and $\Delta_2 U^n$ from the memory rows (m=0,1,2) of the a-position. It then finds $U^{n+1}$, and writes it in the memory row (m=0) of the a-position. Then, the procedure returns to (i) of the next step.

In this case, it is found that $$R = \left(1 + \frac{LE + STE}{7LE + 4ME + 6AE + 3SE + 7STE}\right)^{-1}$$

$$= 0.96.$$

Here, LE, AE and etc. represent computation times of the floating operations, to which some middle values of those mentioned above are given.

The above two examples treat the problem on a three dimensional lattice in such a way that every lattice point corresponds to each buffer memory unit. Such a problem is directly fitted for this machine, and is consequently solved with a very high efficiency.

There are, of course, some problems for which it is desirable that the AU's be arranged in a one dimensional array. In such cases, the array is usually assumed to take two positions of the left vertical side and the bottom horizontal side, as seen in FIG. 5. These positions are called A-position and B-position respectively. Since the buffer memory units are not enough to correspond to all nodes of the net by the lines drawn from all places of the processors on the both sides, it is better to provide a portion of the buffer memory and private memories for exclusive use.

It is assumed that every processor is provided with two one dimensional arrays of memory for exclusive use, which correspond to the i-th and j-th direction, and have N memory units, respectively. Those arrays are again called the memory row and the memory column. Notice that 'unit', 'memory row' and 'memory column' are different terminology from those mentioned so far. Every memory unit has a capacity of words. A location in every memory unit is specified by (m=·).

EXAMPLE 3

(ADI method for a two dimensional heat conduction)

The problem is to find $u = u(x,y,t)$ such that $$\frac{\partial u}{\partial t} = \Delta u \left( \Delta = \frac{\partial^2}{\partial x^2} + \frac{\partial^2}{\partial y^2} \right), \ t > 0, \ (x,y) \in G.$$

$$u(x,y,t) = g(x,y,t), \ (x,y) \in \Gamma,$$

$$u(x,y,0) = f(x,y), \ (x,y) \in G.$$

where $G = \{0 < x, y < 1\}$, $\Gamma$ is its boundary, and f,g are the given functions.

A net of computation points is produced by the vertical and horizontal lines $$x = x_i, ih, \ y = y_j = jh$$

$$i,j = 0,1,\ldots,N^2+1, \ (N^2+1)h = 1.$$

Other symbols appearing in the following are assumed to have the same meanings as in the former examples The heat equation is replaced by the following ADI scheme:

$$(1 - \lambda\Delta_1)U^{n+1*} = (1 + \lambda\Delta_2)U^n, \quad (1)$$

$$(1 - \lambda\Delta_2)U^{n+1} = 2U^{n+1*} - (1 + \lambda\Delta_2)U^n, \quad (2)$$

where $\lambda = \tau/2h^2$.

It is here clear that one step from n to n+1 takes two fractional steps to find $U^{n+1*}$ from (1) and $U^{n+1}$ from (2). These computations are allotted to all AU's in the following way: the j-th processor from the bottom of the A-position plays the role of computation on the lattice points on the horizontal line $y = y_j$, and the i-th processor from the left of the B-position plays the role of computation on the lattice points on the line $x = x_i$. Therefore, every processor bears the computation on two one dimensional arrays of lattice points.

Details of solving (1) and (2) are as follow:

(i) First, it is assumed that $(1 + \lambda\Delta_2)U^n$ is stored in the whole memory columns (m=0).

(ii) It is transferred to the whole memory rows (m=0) in the direction contrary to that shown in FIG. 6. The processor ((l,m)), for example, divides the data of its own memory column into N parts, and writes them into N buffer memory units (in the former meaning) $(m,0)_l, \ldots, (m,k)_l, \ldots, (m,N-1)_l$ respectively. The processor ((k,l)) then reads the data in $(0,k)_l, \ldots, (m,k)_l, \ldots, (N-1,k)_l$, edits them in the form corresponding to the memory row, and writes in $(l,0)_k, \ldots, (l,N-1)_k$. Further the processor ((j,k)) collects data units from $(0,j)_k, \ldots, (N-1,j)_k$, and writes them in its own memory row.

(iii) Every processor finds a respective part of $U^{n+1*}$ from (1), and writes it in its memory row (m=1). These data in the memory rows (m=1) are then transferred to the whole memory columns (m=1) in the manner shown in FIG. 6.

(iv) Every processor reads respective data from its own memory columns (m=0,1), solves (2), and writes a respective part of its solution in its memory column (m=2). Further, every processor computes $(1 + \lambda\Delta_2)U^{n+1}$, and writes it in its memory column (m=0). Then, the procedure returns to (i).

In this case, it is found that $$R = \left( 1 + \frac{6(LE + STE)}{10LE + 8ME + 8AE + 4DE + SE + 10STE} \right)^{-1}$$

$$= 0.86.$$

The numerator 6(LE+STE) is the exess time for transferring data. It causes a fall in efficiency, but still, 0.86 means a high efficiency.

EXAMPLE 4

(A simple explicit difference scheme for the problem of Example 3)

Here, a simple explicit scheme $$U^{n+1} = U^n + \lambda(\Delta_1 + \Delta_2)U^n, \ \lambda = \tau/h^2$$

is considered. A procedure of using it is given as follows:

(i) First, it is assumed that $U^n$ is stored in the whole memory rows (m=0).

(ii) $U^n$ in the memory rows (m=0) is transferred to the whole memory columns (m=0) in the manner shown in FIG. 6.

(iii) Every processor reads $U^n$ from its own memory column (m=0), computes $\Delta_2 U^n$, and sends it to the memory row (m=1) in the inverse manner of FIG. 6.

(iv) Every processor reads data from its own memory rows (m=0,1), finds $U^{n+1}$, and writes it in the memory row (m=0). Then, the procedure returns to (i).

In this case, $$R = \left( 1 + \frac{6(LE + STE)}{4LE + 3ME + 4AE + 2SE + 4STE} \right)^{-1}$$

$$= 0.72.$$

EXAMPLE 5

(Product of two matrices A and B with the order of $N^2$)

It is assumed that every row vector $\vec{a}^{(p)}$ of A is stored in a memory row of each corresponding processor in the A-position, and that every column vector $\downarrow b^{(q)}$ of b is stored in a memory column of each corresponding processor in the B-position.

The multiplication is done in the following manner. First $\downarrow b^{(0)}$ is transferred to all processors. After receiving it, every processor computes a corresponding scalar product $\vec{a}^{(p)} \cdot \downarrow b^{(0)}$. Such computation is repeated successively for every $\downarrow b^{(1)}, \ldots, \downarrow b^{(N^2)}$. It must be here noted that every buffer memory unit may contain only $N^2/2$ words at most, while every row and column vector has $N^2$ words ($N^2 = 256$). Therefore, every computation of $\vec{a}^{(p)} \cdot \downarrow b^{(q)}$ must be divided in to two parts of $\vec{a}_F^{(p)} \cdot \downarrow b_F^{(q)}$ and $\vec{a}_L^{(p)} \cdot \downarrow b_L^{(q)}$, and then be completed by summing them up, where the suffixes F and L means the former and latter half of every vector, respectively.

Details of the above procedure are given as follows;

The following procedure is repeated for l,m=0,1, . . . , N−1 successively:

(i) A processor ((l,m)) writes its own vector $\downarrow b_F$ in all buffer memory units (m,k)$_l$(k=0,1 . . . , N−1).

(ii) Every processor ((k,l)) (k=0,1, . . . , N−1) reads it from (m,k)$_l$, and writes it in all (l,j)$_k$ (j=0,1, . . . , N−1).

(iii) Every processor ((j,k)) reads it from each corresponding unit (l,j)$_k$, and computes each $\vec{a}_F \downarrow b_f$.

(iv) In a similar manner, $\vec{a}_F \downarrow b_L$ is also computed, and is added to the former part of the product.

In this case, $$R = \left(1 + \frac{2(LE + STE)}{LE + ME + AE + STE}\right)^{-1}$$

$$= 0.64.$$

Therefore, the speed of parallel processing is only 0.64N$^2$ times that of uni-processing. It is because an essential part of parallel computation (which is described by the denominator of the expression) is so simple and short that the time used for transferring (which is described by the numerator of the same expression) is relatively large.

The cases of Example 3,4 and 5 can be treated more efficiently by the previous computer mentioned above, but its hardware becomes very bulky. Therefore, in the case of using a large number of processors, this new computer seems to be superior to the previous one for practical use.

While the preferred embodiment of the present invention has been described, other modifications will be apparent to those skilled in the art without departing from the scope and principles of the claimed invention.

What is claimed is:

1. A multiprocessor parallel computer system comprising:

a control computer system;

a plurality of identical slave processors arranged in an N by N matrix in the form of ---
AU-((0,0)), AU-((0,1)), . . . , AU-((0,N-1))
AU-((1,0)), Au-((1,1)), . . . , AU-((1,N-1))
 . . . AU-((j,k)) . . .
 . . . AU-((k,i)) . . .
---

-continued
---
AU-((N-1,0)), AU-((N-1,1)), . . . , AU-((N-1,N-1))
--- where N is an integer selected to be greater than one, and where AU-((j,k)) is the slave processor located in the jth row and kth column of said N by N matrix, each row of N of said slave processors being connected to said control computer system through a separate bus serving said row of N slave processors; and a plurality of identical buffer memory units arranged in a three-dimensional array consisting of N matricies, N by N, in the form of ---
(0,0)$_k$; (0,1)$_k$; . . . ; (0,N-1)$_k$
(1,0)$_k$; (1,1)$_k$; . . . ; (1,N-1)$_k$
 . . . (i,j)$_k$ . . .
 . . . (j,i)$_k$ . . .
(N-1,0)$_k$; (N-1,1)$_k$; . . . ; (N-1,N-1)$_k$
--- where the index k=0, 1, 2, . . . , N−1 is an array number, and where any buffer memory unit (i,j)$_k$ located in the jth column and the ith row of the kth matrix of said N by N memory matricies, and every buffer memory unit on the ith row, (i,j)$_k$ (j=0,1, . . . , N−1) is interconnected to the processor AU-((k,i)) via a corresponding common 'row' bus, while every unit on the jth column, (i,j)$_k$ (i=0,1,2, . . . , N−1) is interconnected to the processor AU-((j,k)) via a corresponding common 'column' bus; and where any two processors with the same index k, said AU-((k,i)) and said AU-((j,k)), can transfer data to one another through the buffer memory unit (i,j)$_k$, and any two slave processors, AU-((l,m)) and said AU-((j,k)), not directly interconnected by a corresponding buffer memory unit, transfer data to one another through either of two mediation slave processors, AU-((m,j)) or AU-((k,l)), said slave processors AU-((m,j)) and AU-((k,l)) being interconnected to said slave processor AU-((l,m)) through corresponding buffer memory units (j,l)m and (m,k)$_l$, respectively, and to said processor AU-((j,k)), through corresponding buffer memory units, (k,m)$_j$ and (l,j)$_k$, respectively.

2. A computer system as recited in claim 1 wherein said control computer system comprises a master processor and a plurality, N, of submaster processors, each of said submaster processors being connected to said master processor and to a corresponding row of said slave processors of said matrix of slave processors.

* * * * *

UNITED STATES PATENT AND TRADEMARK OFFICE
CERTIFICATE OF CORRECTION

PATENT NO. : 4,514,807
DATED : April 30, 1985
INVENTOR(S) : Tatsuo Nogi

It is certified that error appears in the above-identified patent and that said Letters Patent is hereby corrected as shown below:

In Claim 1, at column 13, lines 52 and 53 should read as follows:
$$...AU-((j,k))...$$
$$...AU-((k,i))...\ ;$$

column 14, lines 18 and 19 should read as follows:
$$...(i,j)_k...$$
$$...(j,i)_k...$$

In column 14, at lines 35, 39-43 and 45, the letter "1" should read "$\ell$".

Signed and Sealed this

Nineteenth Day of November 1985

[SEAL]

Attest:

Attesting Officer

DONALD J. QUIGG

Commissioner of Patents and Trademarks